UNITED STATES PATENT OFFICE.

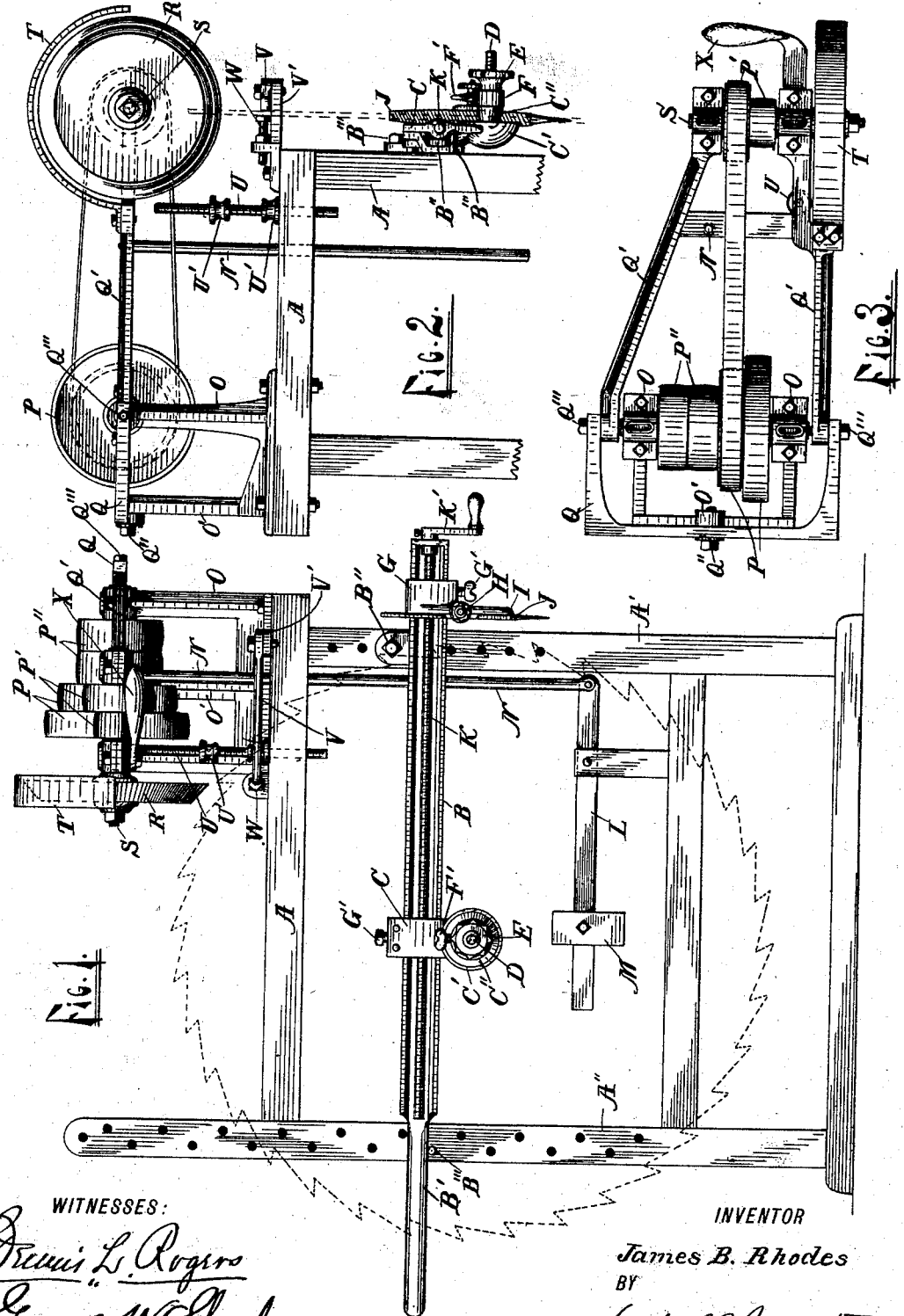

JAMES B. RHODES, OF GRAND RAPIDS, MICHIGAN.

SAW-GUMMER.

SPECIFICATION forming part of Letters Patent No. 502,319, dated August 1, 1893.

Application filed April 8, 1892. Serial No. 428,393. (No model.)

*To all whom it may concern:*

Be it known that I, JAMES B. RHODES, a citizen of the United States, residing at Grand Rapids, in the county of Kent and State of Michigan, have invented certain new and useful Improvements in Saw-Gummers; and I do hereby declare the following to be a full, clear, and exact description of the invention, such as will enable others skilled in the art to which it appertains to make and use the same.

My invention relates to improvements in saw gummers, and its object is to provide the same with certain new and useful features hereinafter more fully described, and particularly pointed out in the claims, reference being had to the accompanying drawings in which—

Figure 1 is a front elevation of a device embodying my invention; Fig. 2 a side elevation of the same, with the lower part removed; and Fig. 3 a plan view of the upper part of the same.

Like letters refer to like parts in all the figures.

A, A' and A'' represent parts of a suitable frame work, to which the various parts of the machine are attached. A bar B having beveled sides and terminating in a handle B' is pivoted to the leg A by a bolt B'' near the end opposite the said handle, and supported near the other end by a pin B''' in the leg A'. Said legs are provided with a series of holes in each whereby the bolt B'', and the pin B''' may be vertically adjusted to raise and lower the bar B, upon which bar is mounted the carriage C having a cup C' provided with a central stud D upon which is a binding nut E, a collar F having a set screw F' and a cone C''. Said cone centers the saw and forces the same against the face of the cup C' by means of the nut E, as it is moved toward the cup. The collar F when secured by the screw F' prevents turning the nut E back by the rotation of the cone as the saw is turned. This carriage traverses the bar B by means of a screw K turned by the crank K'. G is another carriage adapted to be moved along the bar by hand and stopped in position by a set screw G'. Upon this is a vertical flange I facing the edge of the saw upon which flange is secured a file J, by means of the set screw H, for jointing the teeth of said saw. Upon the top of the frame are mounted the hangers O O in which is journaled a counter shaft having the cone pulley P belted to the cone pulley P' on the spindle S. Said shaft has also the tight and loose pulleys P for the driving belt of the machine; midway behind said counter shaft is a post O' to the top of which is pivoted the yoke Q, by means of the set screw Q'' which screw when tightened also secures said yoke in position. Said yoke is adapted to turn upon said pivot in a vertical plane and embraces the counter shaft, opposite the ends of which shaft are the pivots Q''' by which the frame Q' is pivoted to said yoke at the rear, whereby it turns on said pivots about an axis which at all times coincides with the axis of the counter shaft at the middle, and may be inclined thereto by turning the yoke upon its pivot. The outer end of said frame Q is provided with journal boxes for the spindle S, which overhangs at one side of said frame and has attached the emery wheel R of suitable shape for grinding the teeth of the saw. Said frame is also provided with a handle X to manipulate the same, and has also a guard T over the emery wheel. This frame is counter balanced at its outer end by means of a weight M adjustably secured to the pivoted bar L, to which bar opposite said weight is attached the lower end of the rod N, the upper end of which rod engages and supports the frame Q'.

U is a post vertically adjustable by means of suitable nuts U' which post engages said frame and stops its descent, toward the saw.

V is an arm pivoted by a set screw to a hanger V' outside the radius of the saw. The free end of said arm is swung in contact with the outer surface of the saw, and fixed in position by said set screw. Opposite to the end of said arm is an adjustable stud W, which also comes into contact with the saw. This arm and stud serve to prevent vibration of the saw.

The operation of my invention is as follows: By placing the saw upon the carriage C and properly adjusting the cone C'' to permit the saw to rotate about the same, and setting the file carriage G so that the surface of the file will be near the ends of the teeth, the saw may be jointed by rotating the same and moving it slowly toward the file by turning the screw K. It is evidently not material which of said carriages is moved by the screw K, for this operation. By providing a separately adjustable stud W and arm V, I am able to adapt them to any thickness, or gage of saw. By means of the frame Q', pivoted to the yoke O, opposite the ends of the shaft, and pivoting the yoke in the middle, I am able to incline the spindle, or arbor to the horizontal plane, and also raise and lower it in the arc of a circle about the counter shaft, without pivoting the frame Q' on the counter shaft, which is objectionable, on account of friction and wear.

What I claim is—

1. In combination with a saw gummer having mechanism for grinding the teeth in succession, and an adjustable carriage, adapted for holding the saw, and permitting the same to rotate; an adjustable carriage adapted to hold a file against the ends of the teeth of said saw and joint the same, substantially as described.

2. In a saw gummer the combination of a bar, a carriage moving on said bar, a screw engaging said carriage, a cup, a stud, a cone, and a binding nut on said carriage to hold the saw, and an adjustable file carriage on said bar, having a flange and binding screw to hold a file against the ends of the teeth of said saw, substantially as described.

3. In a saw gummer, in combination with a counter shaft, and a spindle having an emery wheel attached, and pulleys and belts to operate the same; a yoke pivoted near its middle, and having arms embracing, and disconnected from the counter shaft and a frame having bearings for said spindle, and pivoted to the respective arms of said yoke opposite the respective ends of said counter shaft, substantially as described.

4. In a saw gummer, the combination of an adjustable bar, a movable saw carriage on said bar, a screw engaging and moving said saw-carriage, and an adjustable file carriage on said bar, an emery wheel, a spindle, a counter shaft and pulleys and belts to operate the same, and a frame having said spindle journaled therein, and a yoke pivoted to said frame opposite the ends of said counter-shaft, and turning on a pivot near its middle, substantially as described.

In testimony whereof I affix my signature in presence of two witnesses.

JAMES B. RHODES.

Witnesses:
 LUTHER V. MOULTON,
 LOIS MOULTON.